(12) United States Patent
Small

(10) Patent No.: US 10,324,191 B2
(45) Date of Patent: Jun. 18, 2019

(54) METHOD AND DEVICE FOR CHRONOLOGICALLY SYNCHRONIZING A KINEMATIC LOCATION NETWORK

(71) Applicant: LOCATA CORPORATION PTY LTD, Bruce, Australian Capital Territory (AU)

(72) Inventor: David Small, Numeralla (AU)

(73) Assignee: Locata Corporation Pty Ltd, Bruce, ACT (AU)

( * ) Notice: Subject to any disclaimer, the term of this patent is extended or adjusted under 35 U.S.C. 154(b) by 316 days.

(21) Appl. No.: 15/327,333

(22) PCT Filed: Jul. 22, 2015

(86) PCT No.: PCT/AU2015/050412
§ 371 (c)(1),
(2) Date: Jan. 18, 2017

(87) PCT Pub. No.: WO2016/011505
PCT Pub. Date: Jan. 28, 2017

(65) Prior Publication Data
US 2017/0168163 A1    Jun. 15, 2017

(30) Foreign Application Priority Data

Jul. 25, 2014 (AU) ................................ 2014902899

(51) Int. Cl.
*G01S 19/10* (2010.01)
*G01S 19/29* (2010.01)
(Continued)

(52) U.S. Cl.
CPC .............. *G01S 19/10* (2013.01); *G01S 1/024* (2013.01); *G01S 1/042* (2013.01); *G01S 1/24* (2013.01);
(Continued)

(58) Field of Classification Search
CPC . G01S 1/024; G01S 1/042; G01S 1/24; G01S 5/021; G01S 5/0289; G01S 19/254; G01S 19/29
(Continued)

(56) References Cited

U.S. PATENT DOCUMENTS 5,886,665 A    3/1999 Dosh
6,121,928 A    9/2000 Sheynblat
(Continued)

FOREIGN PATENT DOCUMENTS

EP    2922040 A1 *  9/2015 ............... G08G 1/22
WO    1999050985 A1   10/1999
(Continued)

OTHER PUBLICATIONS

Extended European search report dated Mar. 7, 2018 in respect of European counterpart application No. 15825228.8.

*Primary Examiner* — Harry K Liu
(74) *Attorney, Agent, or Firm* — Darren Gardner

(57) ABSTRACT

Methods and devices are presented for synchronizing positioning signals in a kinematic location network. In particular, methods and devices are presented for synchronizing a unique positioning signal generated by a positioning-unit device to a reference positioning signal generated by a reference transmitter, where the positioning-unit device and the reference transmitter are moving relative to each other. In certain embodiments the reference transmitter or the positioning-unit device, or both, self-monitor trajectory data comprising one or more of location, velocity or acceleration, e.g. using inertial navigation systems, and broadcast that data in their positioning signals. The trajectory data enables estimation of Doppler shifts and propagation delays associ-
(Continued)

ated with the positioning signals, allowing measurement and correction of clock drift for synchronization of the positioning signals.

18 Claims, 4 Drawing Sheets

(51) Int. Cl.
- *G01S 1/24* (2006.01)
- *G01S 19/25* (2010.01)
- *G01S 1/02* (2010.01)
- *G01S 1/04* (2006.01)
- *G01S 5/02* (2010.01)

(52) U.S. Cl.
CPC ............ *G01S 5/021* (2013.01); *G01S 5/0289* (2013.01); *G01S 19/254* (2013.01); *G01S 19/29* (2013.01)

(58) Field of Classification Search
USPC .................................................... 342/357.47
See application file for complete search history.

(56) References Cited

U.S. PATENT DOCUMENTS

| | | |
|---|---|---|
| 2002/0167934 A1 | 11/2002 | Carter et al. |
| 2007/0041427 A1* | 2/2007 | Small ................. G01S 1/24 375/145 |
| 2010/0066603 A1* | 3/2010 | O'Keefe ................. G01C 15/00 342/357.27 |
| 2013/0057434 A1 | 3/2013 | Krasner |

FOREIGN PATENT DOCUMENTS

| | | |
|---|---|---|
| WO | 2003038469 A1 | 5/2003 |
| WO | 2004008170 A2 | 1/2004 |
| WO | 2005012935 A1 | 2/2005 |

\* cited by examiner

METHOD AND DEVICE FOR CHRONOLOGICALLY SYNCHRONIZING A KINEMATIC LOCATION NETWORK

FIELD OF THE INVENTION

The present invention relates to methods and devices for chronologically synchronizing positioning signals in a kinematic location network, where one or more of the sources of positioning signals are moving relative to each other. However it will be appreciated that the invention is not limited to this particular field of use.

RELATED APPLICATIONS

The present application claims priority from Australian provisional patent application No 2014902899, filed on 25 Jul. 2014, the contents of which are incorporated herein by reference in their entirety.

BACKGROUND OF THE INVENTION

Any discussion of the prior art throughout this specification should in no way be considered as an admission that such prior art is widely known or forms part of the common general knowledge in the field.

Published PCT application No WO 03/038469 A1 entitled 'A Method and Device for Chronologically Synchronizing a Location Network', the contents of which are incorporated herein by reference, discloses methods and systems for generating precise position determinations for a mobile apparatus using positioning signals transmitted from a synchronized network of ground-based transmitters known as positioning-unit devices. Key to these methods and systems is the so-called Time Lock Loop (TLL) which directly measures and corrects timing errors in each positioning-unit device, thereby establishing and maintaining a network of positioning-unit devices transmitting positioning signals which are chronologically synchronized to the timebase of a designated reference transmitter. Once a given positioning-unit device has been synchronized to the timebase of the designated reference transmitter, it can relay the network timebase to further positioning-unit devices that do not have a clear view of the designated reference transmitter, thereby propagating the timebase through an extended network of positioning-unit devices. The Time Lock Loop is extremely robust once established, with the synchronization being unaffected by perturbations such as temperature and voltage changes.

However the TLL methodology disclosed in WO 03/038469 A1 requires the reference transmitter and the positioning-unit devices to be in known and fixed locations with respect to a reference coordinate system. Generally the reference transmitter and the positioning-unit devices are ground-based, although it is also possible for positioning-unit devices to receive reference positioning signals from satellites in geostationary orbits, such as Wide Area Augmentation System (WAAS) satellites. If a reference transmitter and a positioning-unit device were to move relative to each other a Doppler shift would be imposed on the reference positioning signals received by the positioning-unit device. This Doppler will be indistinguishable from clock drift, because both Doppler and clock drift manifest as frequency changes. Consequently the positioning-unit device would, in attempting to synchronize itself to the reference transmitter, erroneously slew its clock, severely degrading the accuracy of position solutions calculated by a mobile apparatus. Methods and devices for synchronizing a kinematic location network are therefore highly desirable, to enable the calculation of accurate position solutions for a mobile apparatus receiving signals from a network of positioning-unit devices in which one or more of the positioning-unit devices are moving relative to the others.

Object of the Invention

It is an object of the present invention to overcome or ameliorate at least one of the disadvantages of the prior art, or to provide a useful alternative.

It is an object of the present invention in a preferred form to provide a method for synchronizing a positioning-unit device to the timebase of a reference transmitter in situations where the reference transmitter and positioning-unit device are moving relative to each other.

It is another object of the present invention in a preferred form to provide a method for generating frequency coherence between positioning signals transmitted by a reference transmitter and a positioning-unit device, in situations where the reference transmitter and positioning-unit device are moving relative to each other.

It is another object of the present invention in a preferred form to provide a positioning system capable of generating accurate position solutions for a mobile apparatus receiving signals from a network of positioning-unit devices in which one or more of the positioning-unit devices are moving relative to the others.

SUMMARY OF THE INVENTION

According to a first aspect of the present invention there is provided a method of chronologically synchronizing a unique positioning signal generated by a positioning-unit device to a reference positioning signal generated by a reference transmitter, wherein said positioning-unit device and said reference transmitter are moving relative to each other, said method comprising the steps of said positioning-unit device:

a) receiving and interpreting said reference positioning signal;

b) generating and transmitting a unique positioning signal, wherein said unique positioning signal is aligned with a steered transmitter clock;

c) receiving and interpreting said unique positioning signal;

d) measuring a frequency difference between the received reference positioning signal and the received unique positioning signal;

e) estimating Doppler associated with the relative movement;

f) adjusting the frequency of said steered transmitter clock by an amount derived from the measured frequency difference and the estimated Doppler;

g) measuring a time difference between the received reference positioning signal and the received unique positioning signal;

h) estimating a reference signal propagation delay between said reference transmitter and itself; and i) adjusting the generation of said unique positioning signal according to the measured time difference and the estimated reference signal propagation delay, wherein said positioning-unit device estimates said Doppler and said reference signal propagation delay from trajectory data for said reference transmitter, or trajectory data for itself, or both, such that said unique positioning signal is chronologically synchronized to said reference positioning signal.

Preferably, steps d) to f) are performed repeatedly. In certain embodiments steps g) to i) are performed repeatedly.

The reference transmitter preferably measures trajectory data for itself using one or more of: an inertial navigation system; positioning signals from satellites of a Global Navigation Satellite System; or positioning signals from a local network of synchronized positioning-unit devices, and broadcasts that trajectory data. Preferably, the positioning-unit device measures trajectory data for itself using one or more of: an inertial navigation system; positioning signals from satellites of a Global Navigation Satellite System; or positioning signals from a local network of synchronized positioning-unit devices. The trajectory data preferably comprises one or more of location information, velocity information and acceleration information. In certain embodiments the trajectory data comprises predictions of one or more of location, velocity and acceleration.

In certain embodiments the positioning-unit device utilizes a predictive routine to estimate the Doppler or the reference signal propagation delay.

According to a second aspect of the present invention there is provided a method of generating frequency coherence between a reference positioning signal generated by a reference transmitter and a unique positioning signal generated by a positioning-unit device, wherein said positioning-unit device and said reference transmitter are moving relative to each other, said method comprising the steps of said positioning-unit device:
  a) receiving and interpreting said reference positioning signal;
  b) generating and transmitting a unique positioning signal, wherein said unique positioning signal is aligned with a steered transmitter clock;
  c) receiving and interpreting said unique positioning signal;
  d) measuring a frequency difference between the received reference positioning signal and the received unique positioning signal;
  e) estimating Doppler associated with the relative movement; and
  f) adjusting the frequency of said steered transmitter clock by an amount derived from the measured frequency difference and the estimated Doppler,
  wherein said positioning-unit device estimates said Doppler from trajectory data for said reference transmitter, or trajectory data for itself, or both, such that said unique positioning signal has frequency coherence with said reference positioning signal.

Steps d) to f) are preferably performed repeatedly.

The reference transmitter preferably measures trajectory data for itself using one or more of: an inertial navigation system; positioning signals from satellites of a Global Navigation Satellite System; or positioning signals from a local network of synchronized positioning-unit devices, and broadcasts that trajectory data. Preferably, the positioning-unit device measures trajectory data for itself using one or more of: an inertial navigation system; positioning signals from satellites of a Global Navigation Satellite System; or positioning signals from a local network of synchronized positioning-unit devices. Preferably, the trajectory data comprises one or more of location information, velocity information and acceleration information. In certain embodiments the trajectory data comprises predictions of one or more of location, velocity and acceleration.

In certain embodiments the positioning-unit device utilizes a predictive routine to estimate the Doppler.

According to a third aspect of the present invention there is provided a positioning-unit device for chronologically synchronizing a unique positioning signal generated by said positioning-unit device to a reference positioning signal generated by a reference transmitter, wherein said positioning-unit device and said reference transmitter are moving relative to each other, said positioning-unit device comprising:
  a) means for receiving and interpreting said reference positioning signal;
  b) means for generating and transmitting said unique positioning signal, wherein said unique positioning signal is aligned with a steered transmitter clock;
  c) means for receiving and interpreting said unique positioning signal;
  d) means for measuring a frequency difference between the received reference positioning signal and the received unique positioning signal;
  e) means for estimating Doppler associated with the relative movement;
  f) means for adjusting the frequency of said steered transmitter clock by an amount derived from the measured frequency difference and the estimated Doppler;
  g) means for measuring a time difference between the received reference positioning signal and the received unique positioning signal;
  h) means for estimating a reference signal propagation delay between said reference transmitter and itself; and
  i) means for adjusting the generation of said unique positioning signal according to the measured time difference and the estimated reference signal propagation delay,
  wherein said positioning-unit device estimates said Doppler and said reference signal propagation delay from trajectory data for said reference transmitter, or trajectory data for itself, or both, such that said unique positioning signal is chronologically synchronized to said reference positioning signal.

Preferably, the positioning-unit device is adapted to perform steps d) to f) repeatedly. In certain embodiments the positioning-unit device is adapted to perform steps g) to i) repeatedly.

In preferred embodiments the positioning-unit device is adapted to measure trajectory data for itself using one or more of: an inertial navigation system; positioning signals from satellites of a Global Navigation Satellite System; or positioning signals from a local network of synchronized positioning-unit devices. The trajectory data preferably comprises one or more of location information, velocity information and acceleration information. In certain embodiments the trajectory data comprises predictions of one or more of location, velocity and acceleration.

In certain embodiments the means for estimating the Doppler, or the means for estimating the reference signal propagation delay, is adapted to utilize a predictive routine.

According to a fourth aspect of the present invention there is provided a positioning-unit device for generating frequency coherence between a reference positioning signal generated by a reference transmitter and a unique positioning signal generated by said positioning-unit device, wherein said positioning-unit device and said reference transmitter are moving relative to each other, said positioning-unit device comprising:
  a) means for receiving and interpreting said reference positioning signal;

b) means for generating and transmitting said unique positioning signal, wherein said unique positioning signal is aligned with a steered transmitter clock;
c) means for receiving and interpreting said unique positioning signal;
d) means for measuring a frequency difference between the received reference positioning signal and the received unique positioning signal;
e) means for estimating Doppler associated with the relative movement; and
f) means for adjusting the frequency of said steered transmitter clock by an amount derived from the measured frequency difference and the estimated Doppler, wherein said positioning-unit device estimates said Doppler from trajectory data for said reference transmitter, or trajectory data for itself, or both, such that said unique positioning signal has frequency coherence with said reference positioning signal.

The positioning-unit device is preferably adapted to perform steps d) to f) repeatedly.

In preferred embodiments the positioning-unit device is adapted to measure trajectory data for itself using one or more of: an inertial navigation system; positioning signals from satellites of a Global Navigation Satellite System; or positioning signals from a local network of synchronized positioning-unit devices. The trajectory data preferably comprises one or more of location information, velocity information and acceleration information. In certain embodiments the trajectory data comprises predictions of one or more of location, velocity and acceleration.

In certain embodiments the means for estimating the Doppler is adapted to utilize a predictive routine.

According to a fifth aspect of the present invention there is provided a method for determining the position of a roving position receiver in a location network comprising one or more reference transmitters and one or more positioning-unit devices, wherein at least one of said positioning-unit devices is moving relative to a reference transmitter as a result of movement of itself or of a reference transmitter, said method comprising the steps of:
a) each of said one or more reference transmitters generating and transmitting a reference positioning signal according to the timebase of said one or more reference transmitters;
b) each of the at least one positioning-unit devices that is moving relative to a reference transmitter:
i) receiving and interpreting the one or more reference positioning signals;
ii) generating and transmitting a unique positioning signal, wherein said unique positioning signal is aligned with a steered transmitter clock;
iii) receiving and interpreting said unique positioning signal;
iv) measuring a frequency difference between each of the received one or more reference positioning signals and the received unique positioning signal;
v) estimating Doppler associated with the relative movement;
vi) adjusting the frequency of said steered transmitter clock by an amount derived from the measured frequency difference and the estimated Doppler;
vii) measuring a time difference between each of the received one or more reference positioning signals and the received unique positioning signal;
viii) estimating a reference signal propagation delay between each of said one or more reference transmitters and itself; and
ix) adjusting the generation of said unique positioning signal according to the measured time difference and the estimated reference signal propagation delay, wherein each of said at least one positioning-unit devices that is moving relative to a reference transmitter estimates said Doppler and said reference signal propagation delay from trajectory data for said reference transmitter, or trajectory data for itself, or both, such that said unique positioning signal is chronologically synchronized to said one or more reference positioning signals; and
c) said roving position receiver:
receiving the chronologically synchronized unique positioning signals, or the one or more reference positioning signals, or both; and
subsequently calculating its own position.

Preferably, steps b) iv) to b) vi) are performed repeatedly. In certain embodiments steps b) vii) to b) ix) are performed repeatedly.

In preferred embodiments each reference transmitter or positioning-unit device that is moving measures trajectory data for itself using one or more of: an inertial navigation system; positioning signals from satellites of a Global Navigation Satellite System; or positioning signals from a local network of synchronized positioning-unit devices, and broadcasts that trajectory data. The trajectory data preferably comprises one or more of location information, velocity information and acceleration information. In certain embodiments the trajectory data comprises predictions of one or more of location, velocity and acceleration.

In certain embodiments each of the at least one positioning-unit devices that are moving relative to a reference transmitter utilizes a predictive routine to estimate the Doppler or the reference signal propagation delay. In certain embodiments the roving position receiver utilizes a predictive routine to estimate the locations or velocities of each positioning-unit device or reference transmitter that is moving.

According to a sixth aspect of the present invention there is provided a positioning system for enabling a roving position receiver to determine its own position, said positioning system comprising a location network and a roving position receiver, said location network comprising:
a) one or more reference transmitters, each configured to generate and transmit a reference positioning signal according to the timebase of said one or more reference transmitters; and
b) one or more positioning-unit devices, at least one of which is moving relative to a reference transmitter as a result of movement of itself or of a reference transmitter, each of those positioning-unit devices comprising:
i) means for receiving and interpreting the one or more reference positioning signals;
ii) means for generating and transmitting a unique positioning signal, wherein said unique positioning signal is aligned with a steered transmitter clock;
iii) means for receiving and interpreting said unique positioning signal;
iv) means for measuring a frequency difference between each of the received reference positioning signals and the received unique positioning signal;
v) means for estimating Doppler associated with the relative movement;
vi) means for adjusting the frequency of said steered transmitter clock by an amount derived from the measured frequency difference and the estimated Doppler;

vii) means for measuring a time difference between each of the received reference positioning signals and the received unique positioning signal;

viii) means for estimating a reference signal propagation delay between said at least one reference transmitter and itself; and ix) means for adjusting the generation of said unique positioning signal according to the measured time difference and the estimated reference signal propagation delay, wherein that positioning-unit device estimates said Doppler and said reference signal propagation delay from trajectory data for said reference transmitter, or trajectory data for itself, or both, such that said unique positioning signal is chronologically synchronized to said one or more reference positioning signals;

c) said roving position receiver comprising:

i) means for receiving chronologically synchronized unique positioning signals or reference positioning signals, or both; and ii) means for subsequently calculating its own position.

Preferably, each positioning-unit device that is moving relative to a reference transmitter is adapted to perform steps b) iv) to b) vi) repeatedly. In certain embodiments each positioning-unit device that is moving relative to a reference transmitter is adapted to perform steps b) vii) to b) ix) repeatedly.

Preferably, each reference transmitter or positioning-unit device that is moving is adapted to measure trajectory data for itself using one or more of: an inertial navigation system; positioning signals from satellites of a Global Navigation Satellite System; or positioning signals from a local network of synchronized positioning-unit devices, and to broadcast that trajectory data. The trajectory data preferably comprises one or more of location information, velocity information and acceleration information. In certain embodiments the trajectory data comprises predictions of one or more of location, velocity and acceleration.

In certain embodiments the means for estimating the Doppler, or the means for estimating the reference signal propagation delay, is adapted to utilize a predictive routine. In certain embodiments the roving position receiver is adapted to utilize a predictive routine to estimate the locations or velocities of each positioning-unit device or reference transmitter that is moving.

According to a seventh aspect of the present invention there is provided a positioning-unit device according to the third aspect, when used in a location network for determining the position of a roving position receiver.

BRIEF DESCRIPTION OF THE DRAWINGS

A preferred embodiment of the invention will now be described, by way of example only, with reference to the accompanying drawings in which.

DETAILED DESCRIPTION

Overview of Prior Art Synchronization Process

Figure 1:
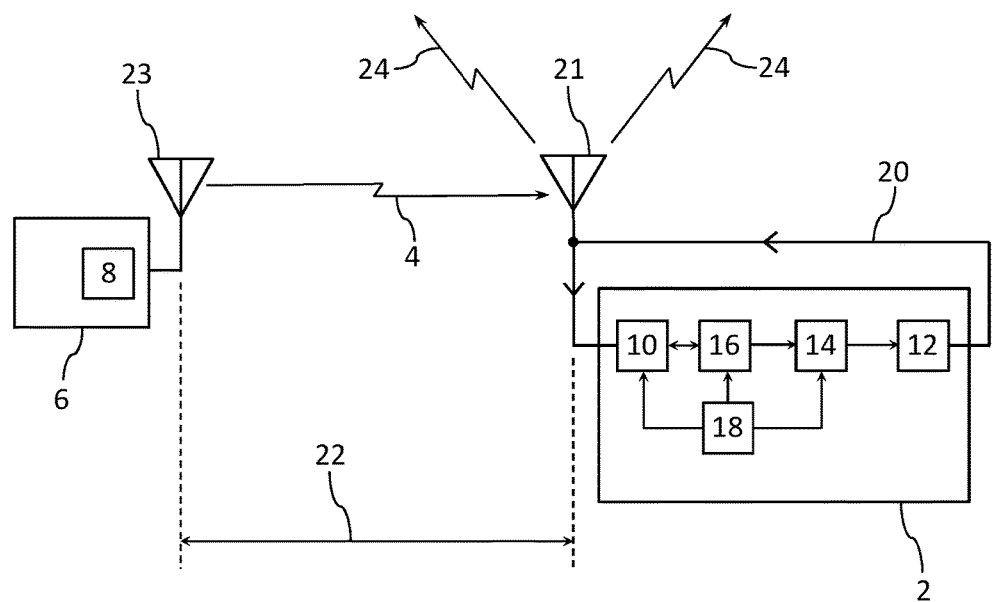
FIG. 1 illustrates the conventional situation of a stationary reference transmitter broadcasting to a stationary positioning-unit device enabling the positioning-unit device to synchronize its positioning signals to the reference transmitter timebase.

The Time Lock Loop (TLL) process disclosed in detail in the abovementioned WO 03/038469 A1 will be discussed briefly with reference to FIG. 1. A positioning-unit device 2 in a fixed and known location with respect to a reference coordinate system, such as the Earth Centered Earth Fixed (ECEF) coordinate system, receives a reference positioning signal 4 transmitted by a reference transmitter 6 in another fixed and known location, and synchronizes itself to the timebase determined by the internally generated clock 8 of the reference transmitter. The positioning-unit device 2 incorporates a receiver 10, a transmitter 12, a steered transmitter clock 14 and a CPU 16, as well as an oscillator 18 that provides a common timebase for the other components. Once the positioning-unit device receives a reference positioning signal 4 it transmits a slave version of a unique positioning signal 20 from its transmitter 12, which is received by its receiver 10. Each of the reference positioning signal 4 and the slave positioning signal 20 has a carrier component, a pseudo-random code component and a data component, with the pseudo-random code and data components being unique to each device. The receiver 10 simultaneously receives and samples the reference positioning signal 4 and slave positioning signal 20 and measures an integrated carrier phase (ICP) difference between the two signals. The CPU 16 zeros the ICP measurements of both the reference positioning signal 4 and the slave positioning signal 20 within the receiver 10, then engages a control loop that continuously applies corrections to the steered transmitter clock 14 to maintain the ICP difference at zero, such that the slave positioning signal 20 achieves and maintains frequency coherence with the reference positioning signal 4.

Frequency coherence is an important stage in the TLL synchronization process, because the time difference observed between the pseudo-random and data components of the reference and slave positioning signals becomes constant once the carrier frequencies of the two signals are aligned. This time difference comprises the propagation time delay, calculated from the known geometric distance 22 between the positioning-unit device antenna 21 and the reference transmitter antenna 23, and the timebase offset (or time bias) between the positioning-unit device steered transmitter clock 14 and the reference transmitter clock 8. This calculation allows the two signals to be brought into chronological alignment. In a preferred embodiment the positioning-unit device achieves the time bias correction in a two stage process comprising a coarse slew on the pseudo-random code, i.e. temporarily clocking the pseudo-random code generator of its transmitter 12 at a faster or slower rate, followed by application of an additional frequency offset to the steered transmitter clock 14 for a predetermined time period. The propagation time delay can be accounted for at either stage.

Figure 2:
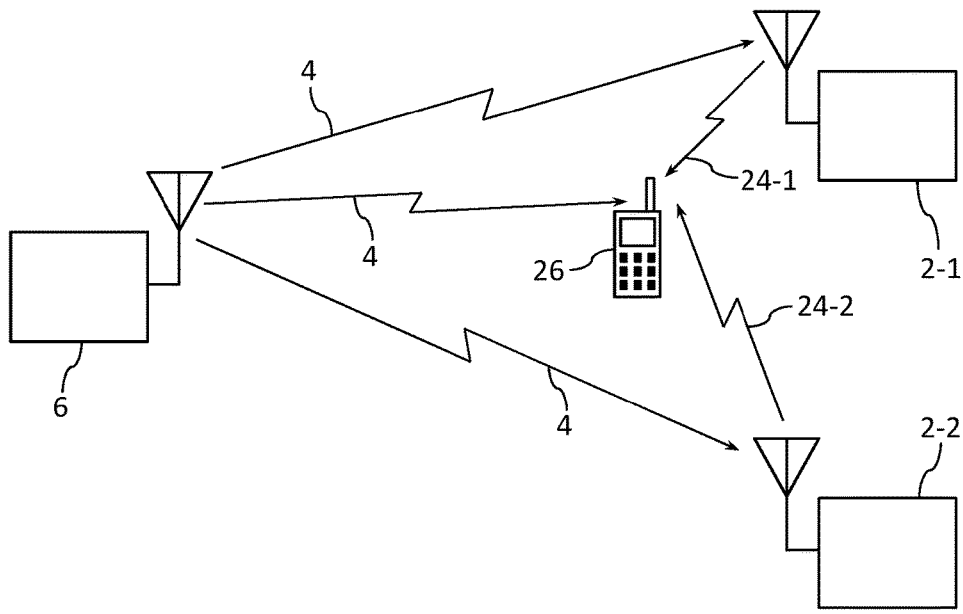
FIG. 2 illustrates a prior art positioning system comprising a stationary reference transmitter broadcasting to a plurality of stationary positioning-unit devices, and a roving position receiver able to determine a single point position solution using received positioning signals.

When the slave positioning signal 20 has frequency coherence with the reference positioning signal 4 and is chronologically aligned with the reference transmitter's timebase, it is fully synchronized to the reference transmitter's timebase and is represented by the transmitted unique positioning signal 24. Importantly, the differencing procedure in the TLL eliminates any receiver line bias or group delay caused by the receiver electronics or temperature variations. With reference to FIG. 2, a mobile apparatus in the form of a roving position receiver 26 situated within a location network comprising a reference transmitter 6 and chronologically synchronized positioning-unit devices 2-1, 2-2 can receive unique positioning signals 24-1, 24-2 from the positioning-unit devices, or reference positioning signals 4 from the reference transmitter 6, or both, and autonomously calculate both code and carrier-based position solutions. More generally, a roving position receiver can calculate position solutions utilizing positioning signals from any synchronized positioning-unit devices in view, possibly including the designated reference transmitter. Signals from three or more positioning-unit devices and/or reference transmitters are typically required, although in certain situations it is possible for a position solution to be calculated from fewer than three positioning signals. For example if a roving position receiver has a highly accurate clock with a known relation to the timebase of a location network, it can calculate a two-dimensional position solution from only two positioning signals.

It is also possible for a positioning-unit device to receive reference positioning signals from two or more time-synchronized reference transmitters. In this configuration reference signal error sources such as multipath and tropospheric delay can be averaged between reference transmitters to improve timebase accuracy. Further implementation details of a chronologically synchronized positioning system, e.g. on the transmission and interpreting of CDMA positioning signals and on device hardware, are described in the above mentioned PCT publication WO 03/038469 A1. As described therein, the positioning signals are typically radio frequency (RF) signals.

Limitation of Prior Art Synchronization Process

Figure 3:
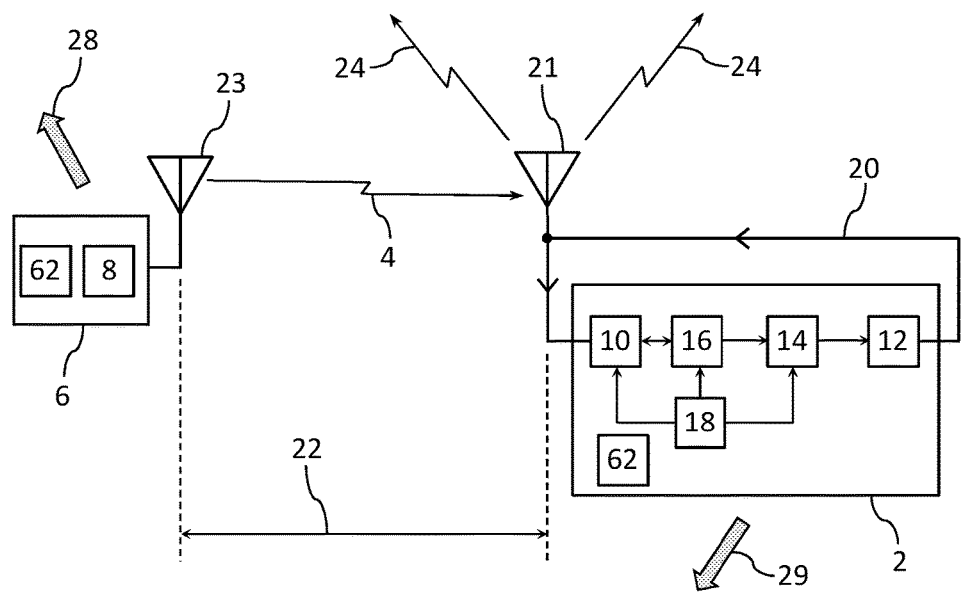
FIG. 3 illustrates a kinematic situation of a reference transmitter broadcasting to a positioning-unit device, where the reference transmitter and the positioning-unit device are moving relative to each other.

FIG. 3 shows a kinematic situation where a reference transmitter 6 and a positioning-unit device 2 are moving relative to each other, as depicted by the arrows 28, 29 representing movement of the reference transmitter and/or the positioning-unit device with respect to a reference coordinate system. This relative motion has two deleterious effects on the above described TLL synchronization process. Firstly and more obviously, the distance 22 between the reference transmitter antenna 23 and the positioning-unit device antenna 21, and therefore the propagation time delay of the reference positioning signal 4, becomes variable. This affects the timebase correction required to chronologically align the unique positioning signal 24 of the positioning-unit device 2 with the timebase of the reference transmitter 6. Secondly, the relative motion imposes a Doppler frequency shift on the reference positioning signal 4, which from the perspective of the positioning-unit device 2 is indistinguishable from drift of its oscillator 18. In general the relative motion will cause the frequency of the received reference positioning signal 4 to vary, preventing the ICP differencing process from correctly establishing frequency coherence between the two positioning signals. In the context of a positioning system as shown in FIG. 2 the resulting synchronization errors, along with the time-varying locations of one or more of the positioning-unit devices 2-1, 2-2 or the reference transmitter 6, severely degrade position solutions calculated by a roving position receiver 26.

Kinematic Synchronization Process

It follows therefore that in a kinematic environment with moving platforms, such as a location network comprising a plurality of moving positioning-unit devices, one of which may be a designated reference transmitter, the above described synchronization process must be modified to account for relative motion between the positioning-unit devices and/or the reference transmitter. One example of a kinematic environment is a plurality of positioning-unit devices mounted on vehicles e.g. for emergency services or law enforcement purposes. In another example a moving platform such as an aircraft may, after determining its position using positioning signals from a synchronized network of fixed ground-based positioning-unit devices in conventional fashion, seek to join the network by synchronizing its own unique positioning signal with the network timebase. In this case the moving platform could treat any of the synchronized ground-based positioning-unit devices, or a synchronized positioning-unit device on another moving platform, as a reference transmitter. In yet another example one or more fixed ground-based positioning-unit devices could use as a reference the positioning signal from a non-geostationary satellite such as a GPS satellite.

For the purposes of this specification we will refer to the modified synchronization process as a 'kinematic Time Lock Loop' (kinematic TLL) process. This process will be described in terms of chronologically synchronizing a unique positioning signal generated by a positioning-unit device to a reference positioning signal generated by a reference transmitter, wherein the positioning-unit device and the reference transmitter are moving relative to each other. In preferred embodiments the reference transmitter is itself a positioning-unit device. Once a given positioning-unit device is synchronized with the timebase of a location network, it can relay the network timebase to further positioning-unit devices that do not have a clear view of the designated reference transmitter.

It should be evident that the terms 'moving relative to each other', 'relative movement', 'relative motion' and the like, when applied to a reference transmitter and a positioning-unit device, encompass a number of situations. For example, with respect to a reference coordinate system, the reference transmitter may be in a fixed location and the positioning-unit device moving, or vice versa, or both may be moving independently.

Figure 4:
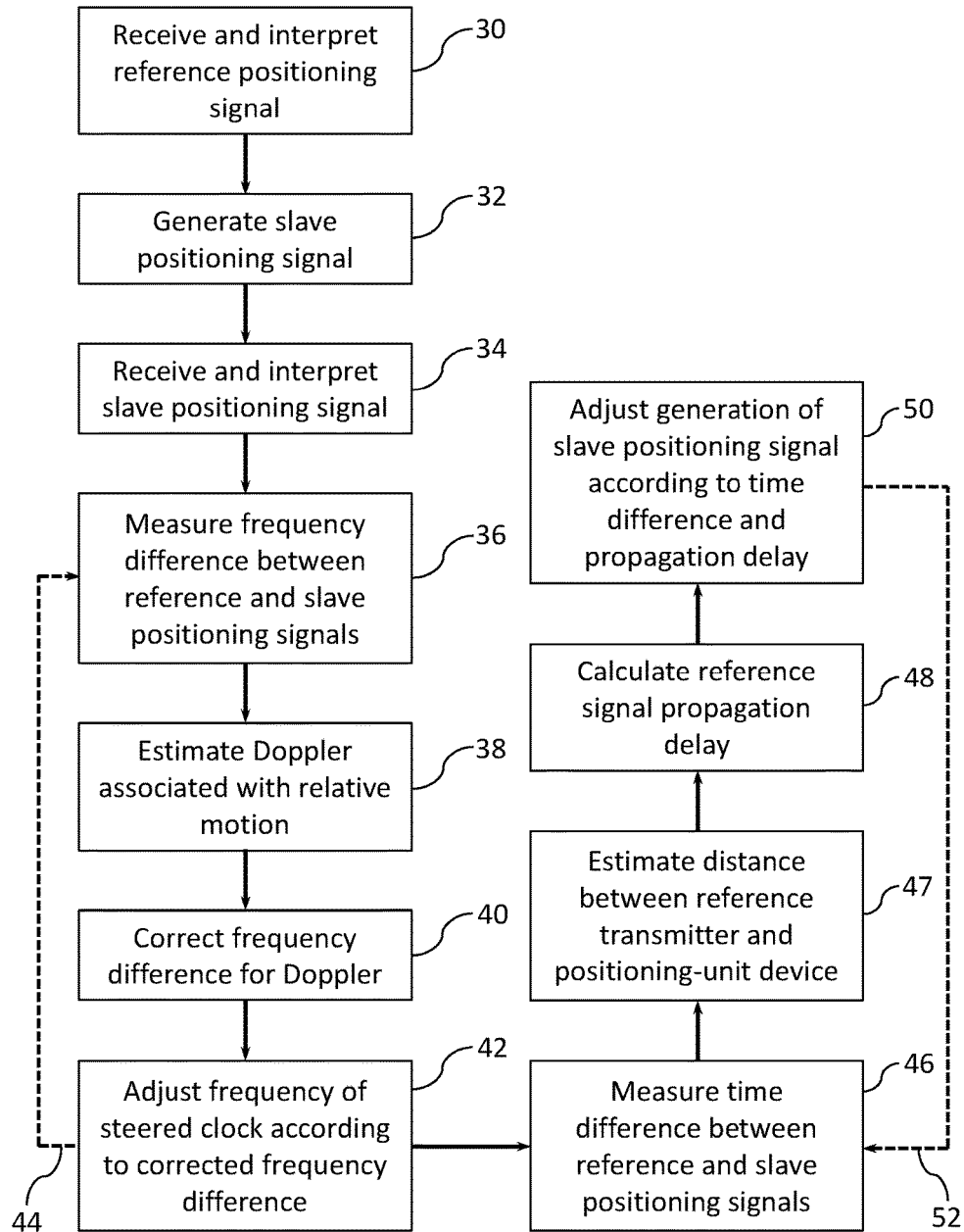
FIG. 4 is a flow chart showing the steps of a synchronization process for moving platforms in a kinematic location network according to an embodiment of the present invention.

A kinematic TLL process according to an embodiment of the invention is described with reference to FIG. 3 and the flow chart of FIG. 4 showing a series of steps performed by a positioning-unit device seeking to synchronize its positioning signal to that of a reference transmitter with which it is in a state of relative motion. In step 30 a positioning-unit device 2 receives and interprets a reference positioning signal 4 generated by a reference transmitter 6. In step 32 the positioning-unit device generates a slave version of a unique positioning signal 20 aligned with its steered transmitter clock 14. Before doing so, the positioning-unit device CPU 16 preferably steers the transmitter clock into approximate time and frequency alignment with the received reference positioning signal 4. In step 34 the slave positioning signal 20 is received and interpreted by the positioning-unit device's receiver 10. A frequency difference between the received reference positioning signal 4 and the received slave positioning signal 20 is measured in step 36, for example by differencing integrated carrier phase measurements of both signals measured over a predetermined period, or by measuring an instantaneous frequency offset. In step 38 the positioning-unit device estimates the Doppler associated with the relative motion between the reference transmitter and itself, as described below in the 'Estimating Doppler' section. The frequency difference is then corrected in step 40 to account for the Doppler, e.g. by removing the estimated Doppler from the measured frequency difference. This yields a corrected frequency difference indicative of the frequency drift of the positioning-unit device 2, and therefore of the frequency and phase difference between the reference positioning signal 4 and the slave positioning signal 20. Frequency drift of the positioning-unit device may for example be caused by drift of its oscillator 18 or by temperature or voltage fluctuations. In step 42 the positioning-unit device adjusts the frequency of its steered transmitter clock 14 by an amount derived from the corrected frequency difference calculated in step 40, which consequently adjusts the generation of the positioning-unit device's slave positioning signal 20.

The two positioning signals 4, 20 are now aligned in frequency, i.e. they are frequency coherent, to an accuracy limited by the accuracy of the Doppler estimate. To prevent the frequencies becoming misaligned by subsequent drift of the positioning-unit device, i.e. to maintain frequency coherence, steps 36, 38, 40 and 42 should be performed repeatedly as represented by the control loop 44. In preferred embodiments the frequency alignment is performed via a closed loop within the CPU 16 of the positioning-unit device which repeatedly applies corrections to the steered transmitter clock 14 based on repeated ICP differencing measurements and Doppler estimations.

Alternatively the frequency alignment is performed by measuring the frequency offset between the received reference positioning signal 4 and the slave positioning signal 20 at the receiver 10, correcting it for the estimated Doppler then feeding it directly to the steered transmitter clock 14 to create a so-called 'Frequency Tracking System' (FTS). The steered transmitter clock simply emulates the frequency offset of the incoming reference positioning signal, corrected for the Doppler estimate. This method requires the positioning-unit device's oscillator 18 to be common between the receiver 10 and transmitter 12 (as is the case in FIG. 3), and is in general less accurate than the preferred closed loop method because common mode errors, caused for example by temperature variations, are not differenced out.

Once frequency coherence has been established the time difference between the reference positioning signal 4 and the slave positioning signal 20 can be accurately measured to eliminate any time bias between the reference transmitter 6 and the positioning-unit device 2. In step 46 the positioning-unit device measures a time difference between the reference positioning signal and the slave positioning signal received and interpreted in steps 30 and 34 respectively, and in step 47 the positioning-unit device estimates the current distance 22 between the reference transmitter antenna 23 and the positioning-unit device antenna 21. From this distance estimate the positioning-unit device 2 calculates in step 48 an estimate of the reference signal propagation delay (i.e. time-of-flight) by dividing the distance estimate by the speed of light. Methods for estimating the distance 22 are discussed below in the section 'Estimating Propagation Delay'. In certain embodiments the value for the speed of light is determined taking into account the effect of the atmosphere, i.e. tropospheric delay, which typically reduces the vacuum speed of light by around 300 ppm. In one particular embodiment the tropospheric delay is estimated using measurements of temperature, pressure and relative humidity at the reference transmitter and at the positioning-unit device.

It will be appreciated that the measured time difference, offset by the estimated reference signal propagation delay, provides an estimate of the clock correction required to align the positioning-unit device 2 with the timebase of the reference transmitter 6. Consequently in step 50 the generation of the slave positioning signal is adjusted according to the measured time difference and the estimated propagation delay to achieve chronological alignment between the reference positioning signal 4 and the slave positioning signal 20. In one embodiment the adjustment is performed by offsetting the frequency of the positioning-unit device's steered clock 14 for a time period derived from the time difference and the estimated propagation delay, while the Doppler-corrected Frequency Lock control loop 44 is temporarily disengaged. This effectively slews the slave positioning signal 20 in time. We note that Doppler estimates should still be measured and corrected for while the control loop is disengaged. In an alternative embodiment the adjustment is performed by slewing the PRN code generator of the positioning-unit device transmitter 12 the requisite amount of code phase (chips), i.e. temporarily clocking the PRN code generator at a faster or slower rate, whilst maintaining the Doppler-corrected Frequency Lock loop 44. In yet other embodiments the adjustment is performed by a combination of these procedures, e.g. a coarse slew involving the PRN code generator followed by a frequency offset.

Once frequency coherence and chronological alignment have been established, the slave positioning signal 20 is declared to be chronologically synchronized with the reference positioning signal 4 and becomes the positioning-unit device's transmitted unique positioning signal 24. The positioning-unit device 2 then becomes part of the synchronized location network so that its positioning signals can be used by roving position receivers to determine accurate single point position solutions as described below. The synchronized positioning-unit device can also relay the network timebase to other positioning-unit devices seeking to enter the network.

As mentioned above, to maintain frequency coherence between the reference and slave positioning signals the frequency alignment portion of the synchronization process, i.e. steps 36, 38, 40 and 42 in FIG. 4, should be performed repeatedly as shown by the control loop 44. In preferred embodiments the chronological alignment portion of the process, i.e. steps 46, 47, 48 and 50 in FIG. 4, is only performed once. However it may be advantageous to perform the chronological alignment repeatedly, as represented by the control loop 52, for example to maintain a check on the chronological alignment or to repair cycle slips.

For completeness we note that it is possible for the chronological alignment portion of the synchronization process to be performed before the frequency alignment portion.

As in the prior art Time Lock Loop synchronization process, it is also possible for a positioning-unit device to receive reference positioning signals from two or more time-synchronized reference transmitters. Again, this configuration enables reference signal error sources such as multipath and tropospheric delay to be averaged between reference transmitters to improve timebase accuracy. However in the context of the present invention it also enables averaging of errors in the estimation of movement-induced Doppler shifts and propagation delay variations.

Returning to the flow chart in FIG. 4, it will be appreciated that the Doppler estimation step 38 could be performed at any time before the frequency difference is corrected in step 40. For example it could be performed before the frequency difference measurement step 36, or even before the reference positioning signal is received and interpreted in step 30. Once the frequencies have been aligned in step 42 for the first time, for the purposes of maintaining frequency lock using the control loop 44 it would be convenient to estimate the Doppler immediately before or after the frequency difference measurement step 36.

Similarly, there is considerable flexibility in the order of steps in the time alignment portion of the kinematic TLL process as shown in FIG. 4. For example the distance estimation step 47 could be performed before the time difference measurement step 46, or even before the frequency adjustment step 42.

Figure 5:
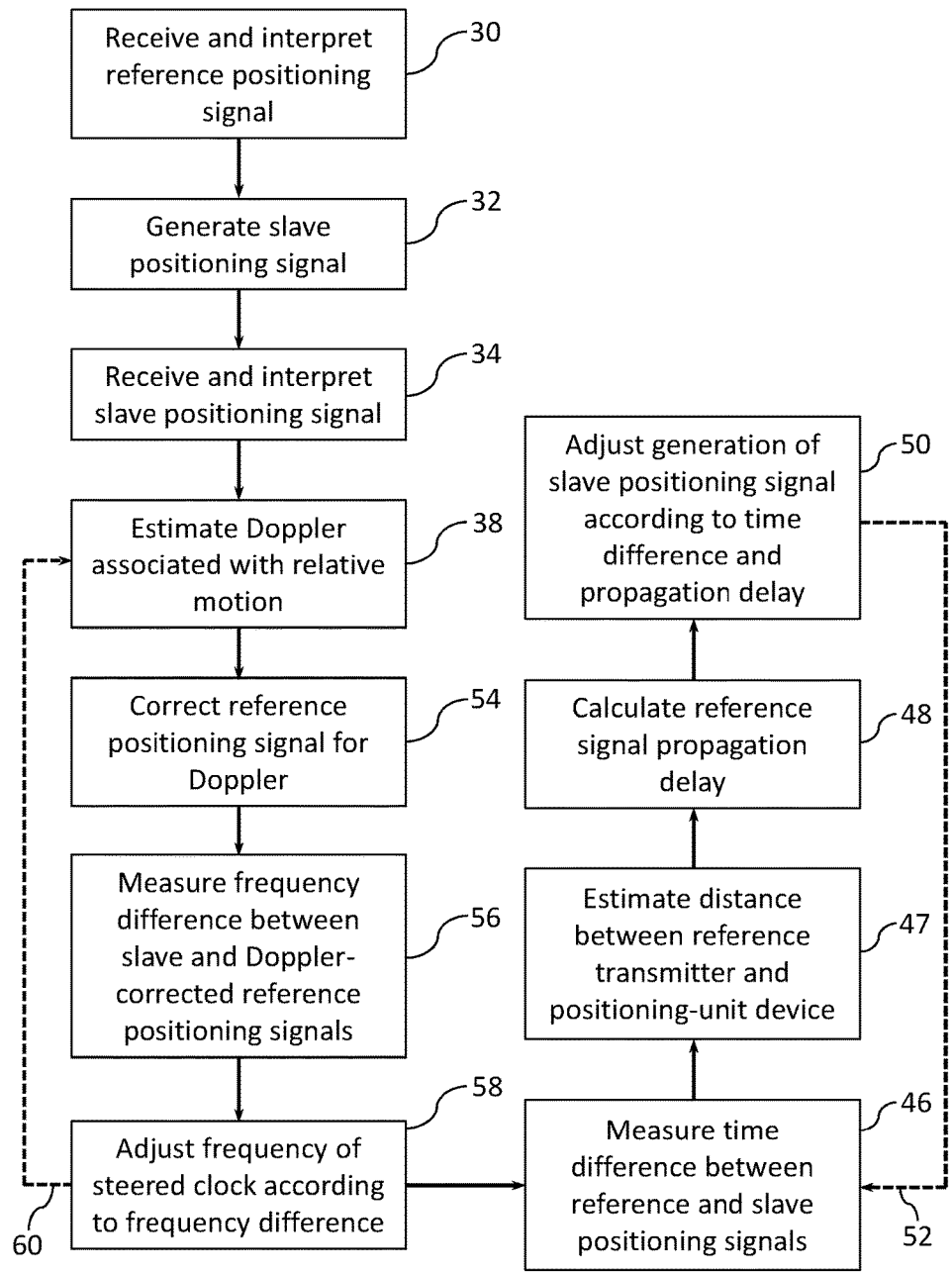
FIG. 5 is a flow chart showing the steps of a synchronization process for moving platforms in a kinematic location network according to another embodiment of the present invention.

A kinematic TLL process according to another embodiment of the invention is described with reference to the flow chart shown in FIG. 5 and the apparatus shown in FIG. 3. As with FIG. 4, the flow chart of FIG. 5 illustrates a series of steps performed by a positioning-unit device 2 seeking to synchronize its positioning signal to that of a reference transmitter 6 with which it is in a state of relative motion. In step 30 a positioning-unit device 2 receives and interprets a reference positioning signal 4 generated by a reference transmitter 6. In step 32 the positioning-unit device generates a slave version of a unique positioning signal 20 aligned with its steered transmitter clock 14, preferably after the transmitter clock has been steered into approximate time and frequency alignment with the received reference positioning signal 4, and in step 34 the slave positioning signal 20 is received and interpreted by the positioning-unit device's receiver 10. In step 38 the positioning-unit device estimates the Doppler associated with the relative motion between the reference transmitter and itself, as described below in the 'Estimating Doppler' section, then in step 54 the reference positioning signal is corrected for the Doppler. A frequency difference between the Doppler-corrected reference positioning signal and the received slave positioning signal is measured in step 56, for example by differencing integrated carrier phase measurements of both signals measured over a predetermined period, or by measuring an instantaneous frequency offset. In step 58 the positioning-unit device adjusts the frequency of its steered transmitter clock 14 by an amount derived from the frequency difference calculated in step 56, which consequently adjusts the generation of the positioning-unit device's slave positioning signal 20.

The two positioning signals 4, 20 are now aligned in frequency, i.e. frequency coherent. To prevent the frequencies becoming misaligned by subsequent drift of the positioning-unit device, steps 38, 54, 56 and 58 should be performed repeatedly as represented by the control loop 60. The chronological alignment portion of the kinematic TLL process, i.e. steps 46, 47, 48 and 50, along with the optional control loop 52, proceeds in the same manner as described with reference to FIG. 4.

There is considerable flexibility regarding the order of steps in the frequency alignment portion of FIG. 5. For example the Doppler estimation step 38 could occur before the reference positioning signal is received and interpreted in step 30, or the Doppler estimation and correction, steps 38 and 54, could be performed before the slave positioning signal is generated, received and interpreted in steps 32 and 34.

In the embodiment shown in FIG. 5 the Doppler estimate is applied to the received reference positioning signal before the frequency difference is measured in step 56, whereas in the embodiment shown in FIG. 4 the Doppler estimate is applied to the frequency difference. Importantly however the end result is the same: the frequency of the steered clock 14 is adjusted by an amount derived from the Doppler estimate and the measured frequency difference, to align it with the frequency of the reference transmitter clock 8. In yet another embodiment the frequency alignment is initially achieved by Doppler-correcting the received reference positioning signal as shown in FIG. 5, then maintained by repeatedly Doppler-correcting the frequency difference as shown by the control loop 44 in FIG. 4. In general form then, the frequency alignment proceeds with the following steps of the positioning-unit device 2:

(i) Receive and interpret reference positioning signal 4;
(ii) Generate and transmit slave positioning signal 20;
(iii) Receive and interpret slave positioning signal;
(iv) Measure frequency difference between received reference positioning signal and received slave positioning signal;
(v) Estimate Doppler associated with relative motion between reference transmitter 6 and positioning-unit device 2; and
(vi) Adjust frequency of steered transmitter clock 14 by an amount derived from the measured frequency difference and the estimated Doppler.

Estimating Doppler

Because Doppler is, in general, indistinguishable from clock drift, the frequency coherence aspect of the kinematic chronological synchronization process described above depends on the subject positioning-unit device being able to estimate the Doppler imposed on the reference positioning signal by the relative motion between itself and the reference transmitter (step 38 in FIG. 4 or FIG. 5). In preferred embodiments the positioning-unit device estimates this Doppler from trajectory data for the reference transmitter, or trajectory data for itself, or both, where the trajectory data typically comprises information on one or more of location, velocity and acceleration. In the most general case the positioning-unit device and the reference transmitter will both be moving with respect to a reference coordinate system such as the ECEF coordinate system, e.g. if mounted on vehicles engaged in a search and rescue operation, in which case the positioning-unit device requires trajectory data for both the reference transmitter and itself.

In certain embodiments, where a reference transmitter 6 and a positioning-unit device 2 are both on moving platforms, each unit preferably contains a tracking device 62 as shown in FIG. 3 for measuring one or more of location, velocity and acceleration. Each tracking device 62 may for example be an inertial navigation system (INS), a GPS receiver for receiving positioning signals from satellites of a Global Navigation Satellite System, or a receiver for receiving positioning signals from a local network of synchronized positioning-unit devices, which may be stationary or on moving platforms. Alternatively a tracking device may be a combination of these or other systems, such as a GPS-steered INS. Referring to FIG. 3, we note that the receiver 10 of a positioning-unit device 2 could be programmed to calculate position solutions, as well as contributing to the above-described dynamic synchronization process. In this case the receiver 10 can serve as the tracking device 62.

Similarly, if the reference transmitter 6 is itself a positioning-unit device its receiver could be programmed to calculate position solutions, e.g. using GPS signals, and therefore serve as a tracking device 62. In this context we note that position solutions, also known as PVT solutions, calculated by a positioning receiver typically contain location, velocity and time information.

Inertial navigation systems have the advantage of working in environments where external positioning signals are unreliable or unavailable. However even the best such systems experience drift over time so would preferably be supported by a positioning receiver or similar to recalibrate the INS on occasions when external positioning signals are available, e.g. from GPS satellites or a synchronized network of positioning-unit devices. As an alternative to internal tracking devices 62, an external tracking means such as a laser-based system could be used to measure trajectory data for the reference transmitter and/or the positioning-unit device and provide that data to the positioning-unit device. In broad aspect, any suitable means for measuring trajectory data and providing that data to the positioning-unit device may be used.

In certain embodiments a tracking device is not required on one or other of the reference transmitter and the positioning-unit device. For example if a positioning-unit device is receiving a reference positioning signal from a GPS satellite, which is effectively a reference transmitter on a moving platform, the ephemerides data routinely transmitted by the satellite will be sufficient for the positioning-unit device to determine trajectory data for the satellite. Alternatively the positioning-unit device may know a priori the motion of the designated reference transmitter. In embodiments where only the positioning-unit device 2 is on a moving platform, e.g. an aircraft seeking to join a fixed ground-based location network, the reference transmitter 6 need not contain a tracking device. Likewise the positioning-unit device will not require a tracking device if it will always be stationary.

In certain embodiments where the reference transmitter 6 is on a moving platform, it measures its trajectory data at a certain rate (the first measurement rate) using its tracking device 62 and broadcasts that information as part of the data component of its reference positioning signal 4 at a certain update rate (the first update rate). The positioning-unit device 2 measures its own trajectory data at a certain rate (the second measurement rate) via its own tracking device 62, and demodulates the corresponding data for the reference transmitter 6 from the reference positioning signal 4. In preferred embodiments the positioning-unit device also broadcasts its trajectory data as part of the data component of its unique positioning signal 24 at a certain update rate (the second update rate), for the benefit of a roving position receiver using the unique positioning signal for its position solution calculations, or other positioning-unit devices seeking to join the network. If the bandwidth of the data component of a positioning signal is insufficient to broadcast trajectory data at the required update rate, the reference transmitter and/or the positioning-unit device could broadcast their respective trajectory data via separate data links (not shown in FIG. 3).

In preferred embodiments either the reference transmitter 6 or the positioning-unit device 2, or both, measure their trajectory data at rates of 10 Hz or higher, more preferably 100 Hz or higher, and routinely update the data components of their positioning signals 4, 24 with the most recently measured trajectory data. Higher measurement and update rates are preferred for more accurate tracking of the reference transmitter and positioning-unit device, particularly in situations where either of them is moving rapidly or erratically. In certain embodiments the measurement and update rates are adjustable; for example if the reference transmitter or positioning-unit device perceives that its motion is becoming more/less erratic it can increase/reduce the rate at which it measures its trajectory data, or increase/reduce the rate at which it updates the data component of its positioning signal. In certain embodiments the respective measurement and update rates are equal, while in other embodiments the respective update rate is lower than the respective measurement rate.

In preferred embodiments the trajectory data for the reference transmitter or the positioning-unit device, or both, measured by the respective tracking devices 62, comprises at least location and velocity information. Recalling that velocity is a vector quantity, i.e. speed and direction, velocity information is generally sufficient for a positioning-unit device 2 to obtain an estimate for the relative motion between itself and a reference transmitter 6, and therefore the Doppler imposed on the reference positioning signal 4. However because of the propagation delay arising from the distance 22 between the reference transmitter and the positioning-unit device, velocity information transmitted by the reference transmitter and received by the positioning-unit device may not have been measured in the same time epoch as the positioning-unit device's own most recently measured velocity. Consequently more sophisticated procedures may be required to estimate the Doppler with sufficient accuracy. In one example, a reference transmitter could utilize a predictive routine, based on a Kalman filter or a least squares algorithm for example, to calculate predictions of its location and/or velocity, and broadcast those predictions either in the data component of its reference positioning signal or via a separate data link. Similarly, a positioning-unit device could utilize a predictive routine to calculate predictions of its location and/or velocity for broadcast. In another example the positioning-unit device could receive instantaneous (i.e. non-predictive) location or velocity information and utilize a predictive routine to estimate the relative velocity between itself and the reference transmitter, and consequently the Doppler imposed on the received reference positioning signal, at a given instant. In certain embodiments the trajectory data for the reference transmitter or the positioning-unit device, or both, also includes acceleration information. In certain embodiments the reference transmitter or positioning-unit device, or both, measure acceleration using their respective tracking devices 62 and incorporate that information in their trajectory data. In other embodiments the positioning-unit device infers acceleration from recently measured or received velocity information. It will be appreciated that yet more information, e.g. time rate of change of acceleration, could be measured and broadcast as part of the trajectory data for either the reference transmitter or the positioning-unit device, or both.

Conversely in situations where the motion of the reference transmitter or the positioning-unit device is either gradual or highly predictable, it may be sufficient for the trajectory data to contain location information alone, broadcast at a suitable update rate, in which case the positioning-unit device infers the respective velocities from recently measured or received location information. In certain embodiments the reference transmitter or positioning-unit device monitor their own motion and decide how much information (e.g. location alone, or location and velocity, or location, velocity and acceleration) needs to be included in their trajectory data, how often the trajectory data needs to be measured, or how often the trajectory data needs to be updated for broadcast.

For completeness we note that the above described method encompasses the special cases where either the reference transmitter or the positioning-unit device is in a fixed location with respect to a reference coordinate system. For example if the reference transmitter is stationary in a location known to the positioning-unit device there may be no need for the reference transmitter to measure or broadcast any trajectory data, or it may do so only at a slow update rate e.g. 0.1 Hz. In this case the Doppler is determined from the trajectory data of the positioning-unit device alone. Conversely if the positioning-unit device is stationary in a known location the Doppler can be estimated from the trajectory data of the reference transmitter alone, and the positioning-unit device need only measure and broadcast trajectory data at a slow update rate if at all. However in the most general case both devices will be moving, and the Doppler estimated using trajectory data from both.

Estimating Propagation Delay

In the time synchronization portion of the kinematic TLL process as described above with reference to FIGS. 4 and 5, in step 48 the positioning-unit device estimates the reference signal propagation delay (i.e. time-of-flight) based on the speed of light and the estimated distance 22 between the reference transmitter antenna and the positioning-unit device antenna, obtained in step 47. Generally this requires knowledge of the locations of the reference transmitter and the positioning-unit device, which may form part of the trajectory data measured for example using tracking devices 62. Similar to the situation with Doppler estimation, the reference transmitter or the positioning-unit device can utilize a predictive routine such as a Kalman filter or least squares to calculate predictions of their location for broadcast. Alternatively the positioning-unit device could receive instantaneous (i.e. non-predictive) location information from the reference transmitter and utilize a predictive routine to estimate the distance 22 between itself and the reference transmitter. In certain embodiments the reference transmitter's trajectory data includes velocity information in addition to location information, to enable the positioning-unit device to estimate the instantaneous location of the reference transmitter. In other embodiments the positioning-unit device calculates an estimate based on recently received location information. As explained previously, the value of the speed of light can be determined allowing for tropospheric delay.

Position Solutions

Figure 6:
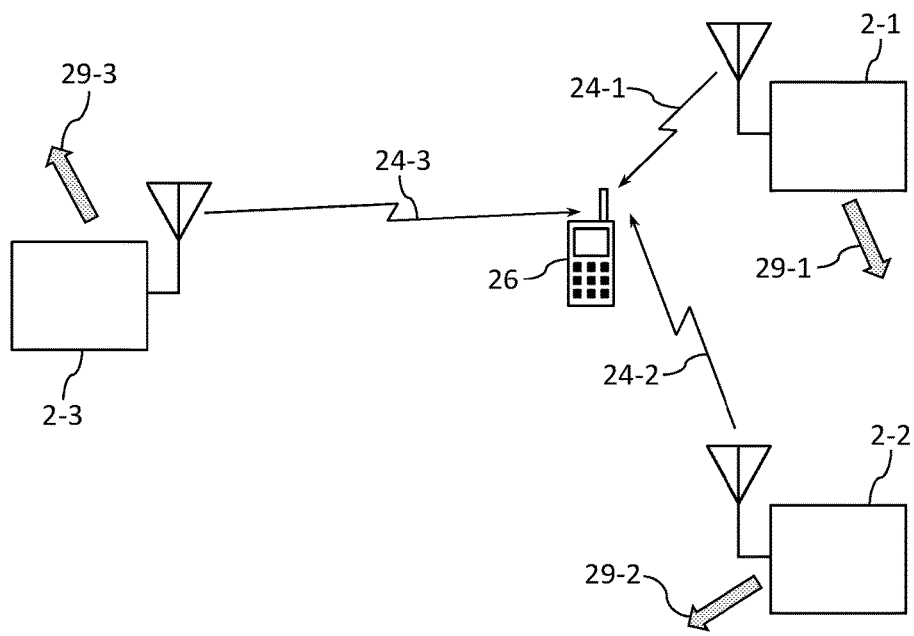
FIG. 6 illustrates a positioning system according to an embodiment of the present invention, comprising a kinematic location network in the form of a plurality of positioning-unit devices moving relative to each other, and a roving position receiver able to calculate a single point position solution using received positioning signals.

Turning now to FIG. 6, there is illustrated a positioning system comprising a kinematic location network in the form of a plurality of synchronized positioning-unit devices 2-1, 2-2, 2-3, at least one of which is moving relative to a reference coordinate system such as the Earth Centered Earth Fixed (ECEF) coordinate system as shown by the arrows 29-1, 29-2 and 29-3, and a roving position receiver 26 able to receive positioning signals 24-1, 24-2, 24-3 from the positioning-unit devices. The positioning signals of the moving positioning-unit devices are chronologically synchronized to the reference positioning signals of one or more reference transmitters via the above described kinematic TLL process, and in preferred embodiments each reference transmitter is itself a positioning-unit device whose signals can be utilized by the roving position receiver. In general the roving position receiver will of course also be moving. The roving position receiver also needs to be able to receive trajectory data from those positioning-unit devices that are moving with respect to the reference coordinate system, so that it can determine or predict the positioning-unit device locations as is required for calculating code and/or carrier-based position solutions from the pseudo-random code and/or carrier components of the positioning signals. This is similar to conventional GPS systems, where roving position receivers utilize satellite ephemerides in their position solution calculations. The trajectory data may include for example information on one or more of location, velocity and acceleration, or predictions thereof. In certain embodiments the positioning-unit devices incorporate their trajectory data into the data components of their positioning signals, while in other embodiments they broadcast their trajectory data via separate data links. In preferred embodiments the roving position receiver 26 utilizes a predictive routine, based on a Kalman filter or least squares for example, to estimate the locations, velocities and/or accelerations of positioning-unit devices and/or the reference transmitter at a given instant.

Although the invention has been described with reference to specific examples, it will be appreciated by those skilled in the art that the invention may be embodied in many other forms.

What is claimed is:

1. A method of chronologically synchronizing a unique positioning signal generated by a positioning-unit device to a reference positioning signal generated by a reference transmitter, wherein said positioning-unit device and said reference transmitter are moving relative to each other, said method comprising the steps of said positioning-unit device:
    a) receiving and interpreting said reference positioning signal;
    b) generating and transmitting a unique positioning signal, wherein said unique positioning signal is aligned with a steered transmitter clock;
    c) receiving and interpreting said unique positioning signal;
    d) measuring a frequency difference between the received reference positioning signal and the received unique positioning signal;
    e) estimating Doppler associated with the relative movement;
    f) adjusting the frequency of said steered transmitter clock by an amount derived from the measured frequency difference and the estimated Doppler;
    g) measuring a time difference between the received reference positioning signal and the received unique positioning signal;
    h) estimating a reference signal propagation delay between said reference transmitter and itself; and
    i) adjusting the generation of said unique positioning signal according to the measured time difference and the estimated reference signal propagation delay,
    wherein said positioning-unit device estimates said Doppler and said reference signal propagation delay from trajectory data for said reference transmitter, or trajectory data for itself, or both, such that said unique positioning signal is chronologically synchronized to said reference positioning signal.

2. A method according to claim 1, wherein steps d) to f) are performed repeatedly.

3. A method according to claim 1, wherein steps g) to i) are performed repeatedly.

4. A method according to claim 1, wherein said reference transmitter measures trajectory data for itself using one or more of: an inertial navigation system; positioning signals from satellites of a Global Navigation Satellite System; or positioning signals from a local network of synchronized positioning-unit devices, and broadcasts that trajectory data.

5. A method according to claim 1, wherein said positioning-unit device measures trajectory data for itself using one or more of: an inertial navigation system; positioning signals from satellites of a Global Navigation Satellite System; or positioning signals from a local network of synchronized positioning-unit devices.

6. A method according to claim 1, wherein said trajectory data comprises one or more of location information, velocity information and acceleration information.

7. A method according to claim 6, wherein said trajectory data comprises predictions of one or more of location, velocity and acceleration.

8. A method according to claim 1, wherein said positioning-unit device utilizes a predictive routine to estimate said Doppler.

9. A method according to claim 1, wherein said positioning-unit device utilizes a predictive routine to estimate said reference signal propagation delay.

10. A positioning-unit device for chronologically synchronizing a unique positioning signal generated by said positioning-unit device to a reference positioning signal generated by a reference transmitter, wherein said positioning-unit device and said reference transmitter are moving relative to each other, said positioning-unit device comprising:
 a) means for receiving and interpreting said reference positioning signal;
 b) means for generating and transmitting said unique positioning signal, wherein said unique positioning signal is aligned with a steered transmitter clock;
 c) means for receiving and interpreting said unique positioning signal;
 d) means for measuring a frequency difference between the received reference positioning signal and the received unique positioning signal;
 e) means for estimating Doppler associated with the relative movement;
 f) means for adjusting the frequency of said steered transmitter clock by an amount derived from the measured frequency difference and the estimated Doppler;
 g) means for measuring a time difference between the received reference positioning signal and the received unique positioning signal;
 h) means for estimating a reference signal propagation delay between said reference transmitter and itself; and
 i) means for adjusting the generation of said unique positioning signal according to the measured time difference and the estimated reference signal propagation delay,
 wherein said positioning-unit device estimates said Doppler and said reference signal propagation delay from trajectory data for said reference transmitter, or trajectory data for itself, or both, such that said unique positioning signal is chronologically synchronized to said reference positioning signal.

11. A positioning-unit device according to claim 10, wherein said positioning-unit device is adapted to perform steps d) to f) repeatedly.

12. A positioning-unit device according to claim 10, wherein said positioning-unit device is adapted to perform steps g) to i) repeatedly.

13. A positioning-unit device according to claim 10, wherein said positioning-unit device is adapted to measure trajectory data for itself using one or more of: an inertial navigation system; positioning signals from satellites of a Global Navigation Satellite System; or positioning signals from a local network of synchronized positioning-unit devices.

14. A positioning-unit device according to claim 10, wherein said trajectory data comprises one or more of location information, velocity information and acceleration information.

15. A positioning-unit device according to claim 14, wherein said trajectory data comprises predictions of one or more of location, velocity and acceleration.

16. A positioning-unit device according to claim 10, wherein said means for estimating said Doppler is adapted to utilize a predictive routine.

17. A positioning-unit device according to claim 10, wherein said means for estimating said reference signal propagation delay is adapted to utilize a predictive routine.

18. A positioning-unit device according to claim 10, when used in a location network for determining the position of a roving position receiver.

* * * * *